J. D. JONES.
GRAIN WINNOWING MACHINE.
APPLICATION FILED FEB. 24, 1913. RENEWED OCT. 30, 1916.

1,235,899.

Patented Aug. 7, 1917.
4 SHEETS—SHEET 1.

Witnesses
R. S. Trogner
L. F. Morrill

Inventor
John D. Jones
By Mason, Fenwick & Lawrence
Attorneys

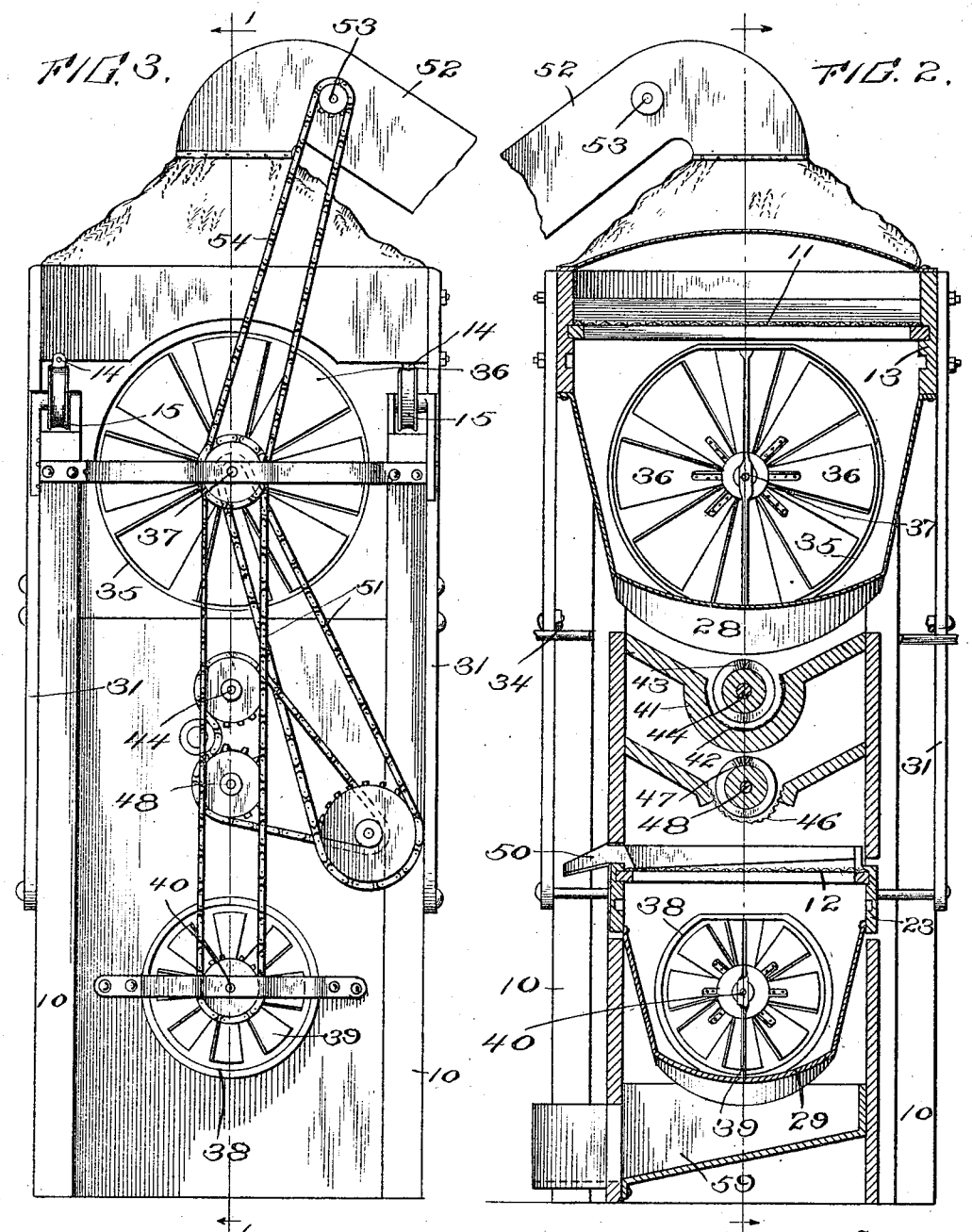

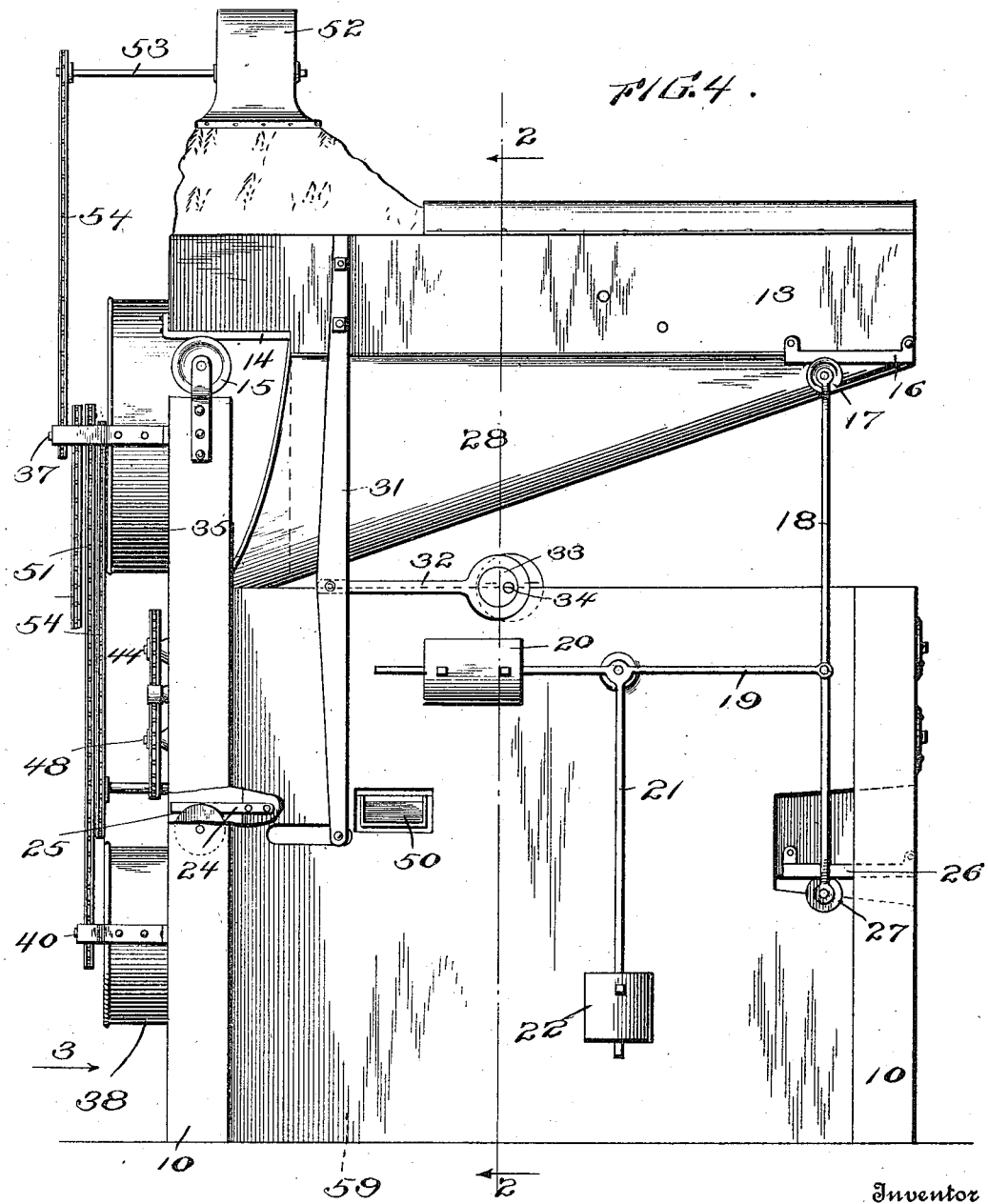

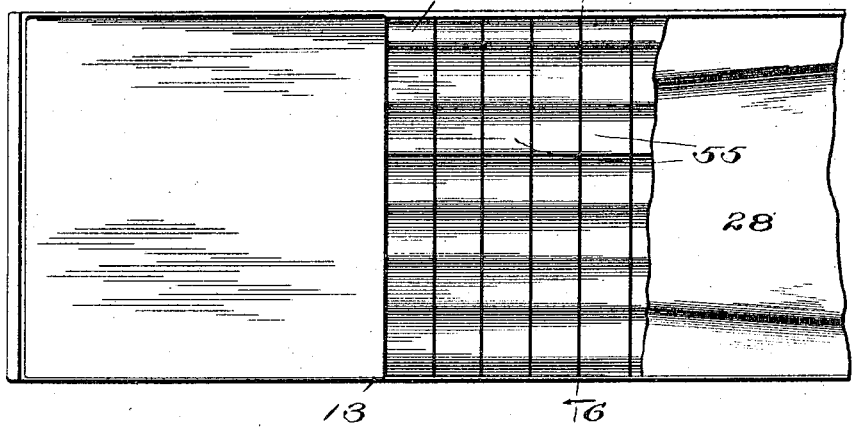
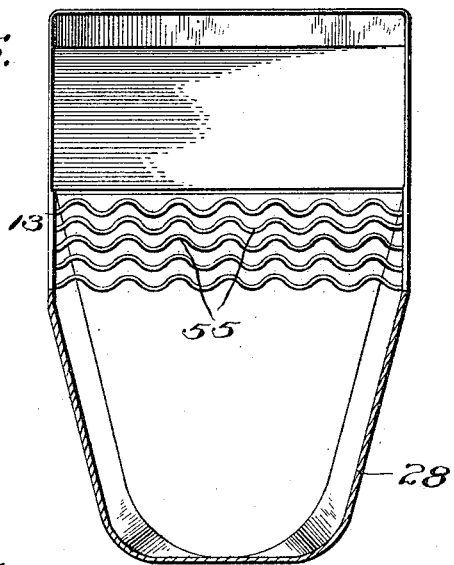
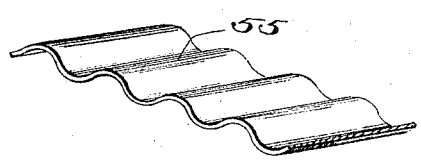

UNITED STATES PATENT OFFICE.

JOHN D. JONES, OF WALLA WALLA, WASHINGTON.

GRAIN-WINNOWING MACHINE.

1,235,899.  Specification of Letters Patent.  Patented Aug. 7, 1917.

Original application filed January 24, 1913, Serial No. 744,021. Divided and this application filed February 24, 1913. Serial No. 750,205. Renewed October 30, 1916. Serial No. 128,637.

*To all whom it may concern:*

Be it known that I, JOHN D. JONES, a citizen of the United States, residing at Walla Walla, in the county of Walla Walla and State of Washington, have invented certain new and useful Improvements in Grain-Winnowing Machines; and I do hereby declare the following to be a full, clear, and exact description of the invention, such as will enable others skilled in the art to which it appertains to make and use the same.

This invention relates to cleaners and while especially adapted for use in conjunction with the harvesting and threshing apparatus disclosed in parent application 744,021, filed January 24th, 1913, of which this application is a division, it may be employed in other positions and for other purposes as circumstances may make desirable.

An object of the present invention is to provide a cleaner with improved means for separating chaff and grain.

A further object of the invention is to provide in a cleaner shaking screens with shoes, and with improved means for introducing air blasts into the shoes under the screens for removing the chaff.

A further object of the invention is to provide an improved form of shoe for catching the grain passing through the screen.

A further object of the invention is to provide an improved form of conveyer for conveying the grain in action.

A further object of the invention is to provide an improved form of screen for use in the cleaner.

A further object of the invention is to provide an improved form of blast fan for introducing an air blast to the shoes.

With these and other objects in view the invention comprises certain novel constructions, combinations and arrangement of parts as will be hereinafter more fully described and claimed.

In the drawings:

Fig. 2 is a transverse vertical sectional view taken on line 2—2 of Fig. 1.

Fig. 3 is a view of the cleaner in end elevation as indicated by arrow 3 at Fig. 1, said Fig. 3 also exhibiting line 1—1 as the plane of Fig. 1.

Fig. 4 is a view of the cleaner in side elevation showing line 2—2 as the plane of Fig. 2.

Fig. 5 is a fragmentary view in top plan of one of the shaking screens.

Fig. 6 is a transverse sectional view through the shaking screen as indicated by line 6—6 of Fig. 5.

Fig. 7 is a perspective view of one of the serpentine strips composing the screen.

Like characters of reference designate corresponding parts throughout the several views.

The improved cleaner which forms the subject matter of this application and as disclosed in parent application 744,021 embodies a frame 10 comprising a housing with upper and lower shaking screens 11 and 12 respectively.

Figure 1:
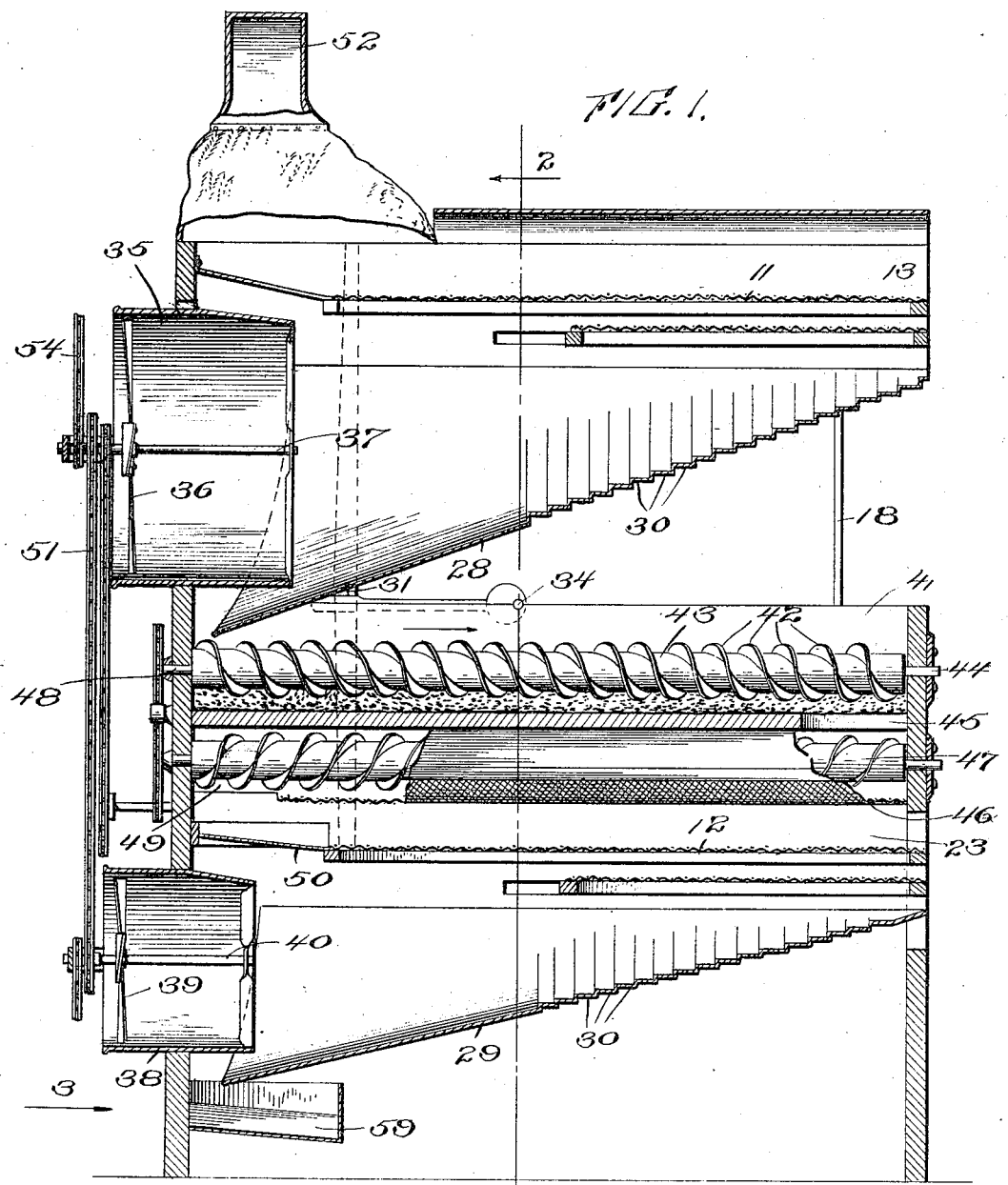
Figure 1 is a longitudinal vertical sectional view of the improved cleaner.

As shown at Figs. 1 and 2 the screens are indicated only as conventional screens, the detail of the screens being shown at Figs. 5, 6 and 7.

The upper shaking screen 11 is mounted in a frame 13 such frame carrying at one end track members 14 bearing upon rollers 15 while the opposite end is provided with similar track sections 16 bearing upon rollers 17. The rollers 17 are carried upon vertical rods 18 which said rods 18 are pivoted to a lever 19 having a counter-weight 20 and a pendulum arm 21 rigidly secured thereto with a pendulum weight 22 thereon by which said screen is retained in horizontal position. The lower shaking screen 12 is mounted in a frame 23 provided with similar track members 24 bearing upon rollers 25 and track sections 26 bearing upon rollers 27 also carried upon the rod 18 whereby the pendulum 22 serves to retain both the upper and lower shaking screens in horizontal position.

Secured to the frames 13 and 23 are shoes 28 and 29 respectively, such shoes being inclined as shown particularly at Fig. 1 and provided with ribs 30 for propelling the grain in the usual well known manner.

The shaking screens are actuated by means of a cross-head 31 secured to the frames 13 and 23 with a pitman 32 actuated by an eccentric 33 carried upon a shaft 34 driven from any continuous source of power.

At the larger end of the shoe 28 a fan housing 35 is provided with a propeller fan 36 mounted to rotate therein upon a shaft 37 and to discharge its air blast directly into the shoe 28.

At the larger end of the shoe 29 a similar fan housing 38 is provided with a similar fan 39 mounted to rotate therein upon the shaft 40 and to likewise discharge a blast of air into the shoe 29.

Under the lower or discharge end of the shoe 28 a conveyer trough 41 is provided having its interior constructed of an abrading material as for instance carborundum as shown at 42. Within the conveyer trough 41 a worm 43 is mounted upon a shaft 44 and adapted to receive grain from the shoe 28. As the grain is delivered to the cleaner a certain portion of the same is likely to be delivered with the hull still inclosing the kernel. It is desirable to remove this hull from the kernel and for this purpose the grain is moved longitudinally along over the roughened surface of the abrading material so that the hull is loosened from the kernel and when brought into position to be acted upon by a further current of air the loosened hull is blown away. At its end opposite the lower end of the shoe 28 the conveyer trough is provided with an opening 45 discharging into a second conveyer trough immediately beneath such conveyer trough being constructed of screen material as indicated at 46. Within the trough 46 a worm 47 is mounted to rotate upon a shaft 48 and an opening 49 is provided through which is discharged material too large to pass through the screen 46, a chute 50 being provided for receiving such larger material. The grain forced through the screen 46 is deposited upon the shaking screen 12 and subjected to the action of such shaking screen, shoe 29 and fan 30 as described in relation to the similar parts above.

The several fans and conveyers are actuated by means of sprocket chains 51, the preferred manner of driving being shown particularly at Fig. 3 although it is to be understood that the specific run of sprocket chains is immaterial to the present invention.

Grain is delivered to the top of the shaking screen 11 through the medium of a conveyer 52 driven from a shaft 53 and sprocket chain 54 from any convenient rotating part as the shaft 37.

Figure 8:
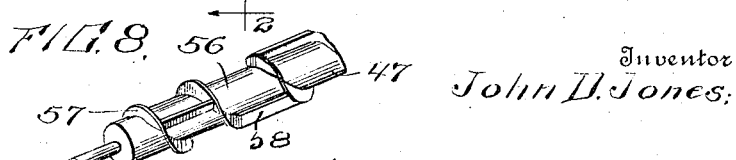
Fig. 8 is a detail perspective view of a fragment of the worm.

Specifically the shaking screens 11 and 12 are constructed of strips of sheet metal stamped to serpentine formation as shown at 55 in Figs. 5, 6 and 7, such strips extending transversely across the frames 13 and 23 and inclined as indicated at Fig. 6. The convolutions of the strips 55 are arranged relative to each other so that the convexity of each strip is immediately above a like convexity of the strip below with a similar arrangement of the concavities so that the concavities and convexities of the said strips register and are in alinement longitudinally of the screen. By this arrangement the spaces between the several strips are equal throughout the entire transverse extent of the screen to permit the passage between such trips of equal and continuous volumes of air from the blast fans 36 and 39. The worms 43 and 47 especially the latter are constructed with a large core or central shaft 56 with a narrow fin 57 as shown more particularly in detail at Fig. 8 with longitudinally extending webs 58 by which the grain being conveyed by such worms is thrown upwardly and agitated as the worms rotate. After being acted upon by the several members in the manner described, the grain cleaned of all extraneous matter is discharged from the lower end of the shoe 29 into the chute 59 by which it is discharged laterally relative to the housing 10.

Special stress is laid upon the employment of the propeller fans in this cleaner whereby the column of air introduced into the shoe is rotating spirally. It has been demonstrated by a long series of tests that such spirally rotating column of air cleans the grain much better than a directly moving column of air especially when used in combination with the screen of serpentine formation as disclosed in this application with the distance between the strips of the screen remaining constant.

I claim:

1. In a threshing machine, a cleaner embodying upper and lower shaking screens, fixed guides for corresponding ends of the shaking screens, movable guides for the opposite ends of the shaking screens, a pendulum, and means connecting the pendulum with the movable guides whereby such guides are simultaneously and similarly acted upon by the pendulum.

2. In a threshing machine, a cleaner embodying upper and lower shaking screens, fixed guides for controlling the path of movement of like ends of the shaking screens, a rod extending vertically between the screens, guides carried at the extremities of the rod and movable therewith, a pendulum and a lever connecting the pendulum and rod whereby the movable guides are simultaneously and similarly acted upon by the pendulum.

3. In a threshing machine, a cleaner embodying a screen and underlying shoe larger at one end, said screen having its bottom curved at such larger end, and a fan housing inserted into the larger end and curved to correspond with the curvature of the shoe.

4. In a threshing machine, a cleaner embodying a screen and underlying shoe, said shoe being larger at one end and having its bottom curved at such larger end, a fan housing inserted into the larger end and curved to correspond with the curvature of the shoe, and means to reciprocate the screen and shoe lengthwise of the shoe.

5. In a threshing machine, a cleaner embodying a shaking screen, a trough disposed above the shaking screen, said trough being composed of screen material, and a conveyer operating to move material within the screened trough.

6. In a threshing machine, a cleaner embodying a shaking screen, a conveyer extending longitudinally of the screen, and means for distributing material by the conveyer to the screen lengthwise of the conveyer.

7. In a threshing machine, a cleaner embodying a shaking screen, a conveyer disposed above the screen, and means to distribute material by the conveyer to the screen in a line corresponding to the line of movement of the conveyer.

8. In a threshing machine, a cleaner embodying a frame having a screen and an underlying shoe provided with an inclined bottom, a fan blower adapted to project a current of air longitudinally of said shoe, a second frame below said first-named frame having a similarly arranged screen and shoe, a blower adapted to project a current of air therethrough, a conveyer arranged to receive the grain from the lower discharge end of said upper shoe and to distribute it over the surface of the screen carried by the lower frame, and means for reciprocating said frames.

9. In a threshing machine, a cleaner embodying upper and lower screens and shoes arranged in parallelism, conveying means adapted to take material from the discharge end of one shoe and distribute it upon the screen of the other shoe, means for reciprocating said screens, and means to automatically raise and lower one end of the screens to maintain them in horizontal position longitudinally to accommodate the movements of the machine.

10. In a threshing machine, a cleaner embodying a shoe; means to shake the shoe in alinement with its length; a fan adapted to project a current of air into the shoe in alinement with its length; and a plurality of corrugations formed in the bottom of the shoe, said corrugations presenting sides substantially perpendicular to and in the path of the current of air.

11. In a threshing machine, a cleaner embodying a shoe, a fan housing inserted in the shoe; a fan mounted in the housing, said housing and fan being adapted to project a current of air in alinement with the length of the shoe; and corrugations formed in the bottom of the shoe presenting sides substantially perpendicular to the current of air.

12. In a threshing machine, a cleaner embodying a shoe, having an inclined bottom; means to vibrate the shoe in alinement with its length; means to project a current of air into the shoe in alinement with its line of vibration; and corrugations formed in the inclined bottom of the shoe, said corrugations being arranged in stepped relation with sides presented substantially perpendicular to the current of air.

13. In a threshing machine, a cleaner embodying an inclined chute; means to project a column of air against the inclined chute at an angle thereto; and corrugations formed in the bottom of the chute having sides substantially perpendicular to and in the path of the column of air.

In testimony whereof I affix my signature in presence of two witnesses.

JOHN D. JONES.

Witnesses:
GEORGE H. MACDONALD,
L. L. MORRILL.

Copies of this patent may be obtained for five cents each, by addressing the "Commissioner of Patents, Washington, D. C."